US008856689B2

(12) United States Patent
Park

(10) Patent No.: US 8,856,689 B2
(45) Date of Patent: Oct. 7, 2014

(54) EDITING OF DATA USING MOBILE COMMUNICATION TERMINAL

(75) Inventor: Jun Serk Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1025 days.

(21) Appl. No.: 12/057,093

(22) Filed: Mar. 27, 2008

(65) Prior Publication Data

US 2008/0263445 A1 Oct. 23, 2008

(30) Foreign Application Priority Data

Apr. 20, 2007 (KR) .................. 10-2007-0039000

(51) Int. Cl.
| | | |
|---|---|---|
| *G06F 3/033* | (2013.01) | |
| *G06F 3/0488* | (2013.01) | |
| *G06F 3/0482* | (2013.01) | |
| *G06F 3/14* | (2006.01) | |
| *G06F 3/00* | (2006.01) | |
| *G06F 3/01* | (2006.01) | |

(52) U.S. Cl.
CPC .. *G06F 3/04883* (2013.01); *G06F 2203/04808* (2013.01); *G06F 2203/04806* (2013.01); *G06F 3/0482* (2013.01)
USPC ............ 715/863; 715/700; 715/702; 715/864

(58) Field of Classification Search
USPC ......... 715/700, 702, 800, 801, 838, 863, 864; 345/173
See application file for complete search history.

(56) References Cited

U.S. PATENT DOCUMENTS

| | | | | | |
|---|---|---|---|---|---|
| 4,633,436 | A | * | 12/1986 | Flurry ........................ | 345/179 |
| 4,746,770 | A | | 5/1988 | McAvinney | |
| 5,272,470 | A | * | 12/1993 | Zetts ........................... | 345/173 |
| 5,602,570 | A | * | 2/1997 | Capps et al. ................ | 345/173 |
| 6,023,265 | A | * | 2/2000 | Lee .............................. | 345/173 |
| 6,061,061 | A | * | 5/2000 | Conrad et al. ............... | 715/781 |
| 6,259,436 | B1 | * | 7/2001 | Moon et al. ................. | 345/173 |
| 6,807,668 | B2 | * | 10/2004 | Stern et al. .................. | 719/329 |
| 7,158,123 | B2 | * | 1/2007 | Myers et al. ................ | 345/173 |
| 7,665,041 | B2 | * | 2/2010 | Wilson et al. ............... | 715/860 |
| 7,743,348 | B2 | * | 6/2010 | Robbins et al. ............. | 715/863 |
| 7,936,341 | B2 | * | 5/2011 | Weiss .......................... | 345/173 |
| 7,956,847 | B2 | * | 6/2011 | Christie ...................... | 345/173 |

(Continued)

FOREIGN PATENT DOCUMENTS

| | | |
|---|---|---|
| EP | 0 622 722 A2 | 11/1994 |
| EP | 1 505 484 A1 | 2/2005 |

(Continued)

OTHER PUBLICATIONS

Photo/Graphic Edges 4.0, Feb. 10, 2003, 7 pages.*

(Continued)

*Primary Examiner* — Matt Kim
*Assistant Examiner* — Yongjia Pan
(74) *Attorney, Agent, or Firm* — Birch, Stewart, Kolasch & Birch, LLP

(57) ABSTRACT

An electronic device, a mobile communication terminal, method and computer program product for editing data The method of editing data of an electronic device displays an item list comprising at least one item; detecting first and second touch inputs and detects a change in a distance between first and second touch input points. The method executes a predetermined function related to the item list according to the detected distance change.

7 Claims, 7 Drawing Sheets

(56) References Cited

U.S. PATENT DOCUMENTS

| | | | |
|---|---|---|---|
| 2002/0036618 A1* | 3/2002 | Wakai et al. | 345/157 |
| 2003/0076352 A1* | 4/2003 | Uhlig et al. | 345/738 |
| 2006/0001650 A1* | 1/2006 | Robbins et al. | 345/173 |
| 2006/0025218 A1 | 2/2006 | Hotta | |
| 2006/0026536 A1* | 2/2006 | Hotelling et al. | 715/863 |
| 2006/0097991 A1* | 5/2006 | Hotelling et al. | 345/173 |
| 2006/0125799 A1 | 6/2006 | Hillis et al. | |
| 2007/0058209 A1* | 3/2007 | Toura | 358/448 |
| 2007/0177804 A1* | 8/2007 | Elias et al. | 382/188 |
| 2007/0236478 A1* | 10/2007 | Geaghan et al. | 345/173 |
| 2007/0252821 A1* | 11/2007 | Hollemans et al. | 345/173 |
| 2008/0122796 A1* | 5/2008 | Jobs et al. | 345/173 |
| 2008/0165136 A1* | 7/2008 | Christie et al. | 345/173 |
| 2008/0165255 A1* | 7/2008 | Christie et al. | 348/207.99 |

FOREIGN PATENT DOCUMENTS

| | | |
|---|---|---|
| EP | 1 517 228 A2 | 3/2005 |
| KR | 10-2007-0020510 A | 2/2007 |
| KR | 10-2007-0040821 A | 4/2007 |
| WO | WO-02/08881 A2 | 1/2002 |
| WO | WO 2006/020304 A2 | 2/2006 |
| WO | WO-2006/020305 A2 | 2/2006 |
| WO | WO-2007/037806 A1 | 4/2007 |

OTHER PUBLICATIONS

M. W. Krueger, "Selected Practical Applications", Jan. 1, 1983, pp. 140-149, XP 002009298.

\* cited by examiner

EDITING OF DATA USING MOBILE COMMUNICATION TERMINAL

CROSS REFERENCE TO RELATED APPLICATIONS

This application is related to and claims priority under 35 U.S.C. §119(a) to Patent Application No. 10-2007-0039000 filed in Republic of Korea on Apr. 20, 2007, the entire contents of which are hereby incorporated by reference.

BACKGROUND

1. Field

This document relates to editing of data using a mobile communication terminal.

2. Related Art

A touch screen, which is used as a user interface for an electronic device, functions as an input and output device. Thus, the touch screen is excellent in space efficiency. Further, the touch screen can provide easier information accessibility since a user may enter a desired menu or information by directly touching the touch screen.

The touch screen recognizes the presence of a touch and a touch position on a displayed screen and processes the corresponding touch event. A simple touch of a user may enable the touch screen to process a corresponding function related to the touch event such as selecting a predetermined area on the screen, or executing a menu provided on the screen.

However, electronic devices of the related art can not support user functions such as an editing function including deleting or adding data, because a separate editing menu or a menu key button has to be manipulated in addition to a touch operation for selecting the data.

SUMMARY

An aspect of this document is to provide an electronic device, a method of editing data using the same, and a mobile communication terminal and computer program product that can easily edit data using a touch screen.

In one general aspect, there is a method and computer program product for editing data of an electronic device, comprising: displaying an item list comprising at least one item; detecting first and second touch inputs; detecting a change in a distance between first and second touch input points; and executing a predetermined function related to the item list according to the detected distance change.

In another aspect, there is an electronic device comprising: a touch screen for displaying an item list comprising at least one item; and a controller for detecting a change in a distance between first and second touch input points that are input through the touch screen and executing a predetermined function related to the item list according to the detected distance change.

In another aspect, there is a mobile communication terminal comprising: a memory for storing phonebook information comprising a name and contact information; a touch screen for displaying phonebook information stored in the memory in a list form; and a controller for detecting a change in a distance between first and second touch input points that are input through the touch screen and executing a predetermined function related to editing of a phonebook information list displayed in the touch screen according to the detected distance change.

Further features will be apparent from the following description, comprising the drawings, and the claims.

BRIEF DESCRIPTION OF THE DRAWINGS

The details of one or more implementations are set forth in the accompanying drawings and the description below. In the entire description of this document, like reference numerals represent corresponding parts throughout various figures.

DETAILED DESCRIPTION

Hereinafter, implementations of an electronic device, a method and computer program product for editing data using the same, and a mobile communication terminal will be described in detail with reference to the accompanying drawings. In describing this document, when it is regarded that descriptions about a related well-known function or configuration are not necessary for understanding a major point of this document, individual descriptions thereof are omitted.

Figure 1:
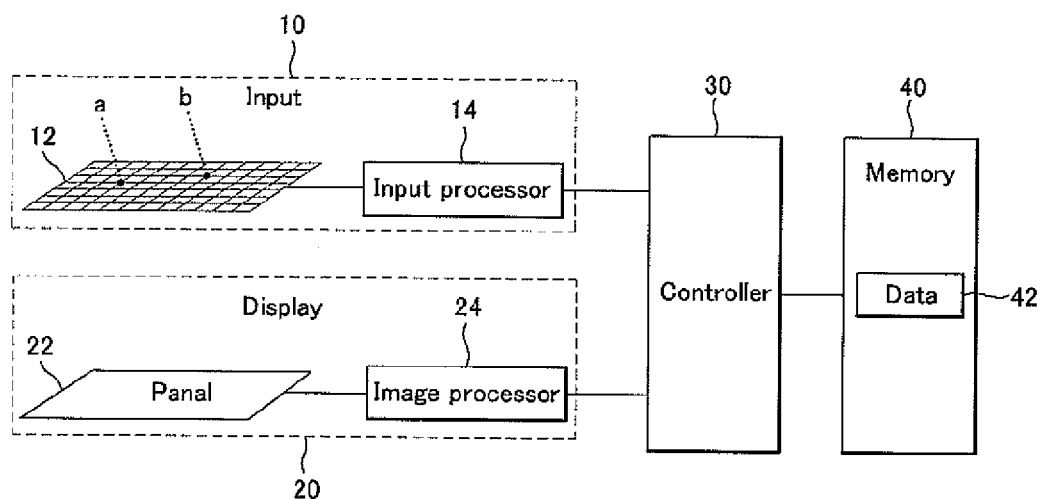
FIG. 1 is a block diagram illustrating a configuration of an electronic device in an implementation.

FIG. 1 is a block diagram illustrating a configuration of an electronic device in an implementation.

As shown in FIG. 1, the electronic device comprises a display 20 for displaying a screen, an input 10 for processing a touch signal input by a user, a memory 40 for storing various data items for displaying in the display 20, and a controller 30 for controlling the display 20 to display a data item stored in the memory 40 or a data item generated by performing a process, and controlling to edit a data item displayed in the display 20 according to a plurality of touch signals that is input through the input 10, and to display an editing state on a screen of the display 20.

The input 10 comprises a touch panel 12 for detecting touch of the user, and an input processor 14 for recognizing a selection position and a moving direction of a touch signal detected in the touch panel 12 and providing the recognized information to the controller 30. The touch panel 12 can detect a touch signal of predetermined points such as 'a' point and 'b' point and use various technologies such as a resistance method, a capacitance method, an infrared ray method, a surface acoustic wave (SAW) method, an electromagnetic method, and a Near Field Imaging (NFI) method. The touch panel 12 uses a transparent panel having a touch response surface and is mounted on a visible surface, for example a liquid crystal display (LCD) 22 of the display 20 to form a touch screen. A touch signal detected by the input 10 comprises a touch signal that is simultaneously input at first and second points and in which a distance between two touch points changes. Accordingly, the input processor 14 receives a touch signal from the touch panel 12, processes information such as an input position and a moving direction of the touch signal, and provides the processed information to the controller 30.

The display 20 comprises an LCD 22 for providing an image and an image processor 24 for converting a data signal provided from the controller 30 to a video signal that can display in the LCD 22 and displaying the converted video signal in the LCD 22. The display 20 can use a plasma display panel (PDP), and an organic light-emitting diode (OLED), in addition to the LCD 22.

The memory 40 stores various data items that can display in the display 20, and the data item comprises data stored by the user and data provided in a terminal. The data item comprises a picture, an image, phonebook information, and memo information stored by the user, and graphic data and thumbnail data provided in a terminal. The data item indicates various kinds of data that can be edited, i.e. that can be deleted, added, and corrected by the user.

The controller 30 controls to display a data item stored in the memory 40 or a data item generated by performing a predetermined function in a list of a text index form or a thumbnail matrix form. Accordingly, the controller 30 controls the display 20 to display a text data item input by the user in an index form or a data item such as a picture and an image in a matrix form using the corresponding thumbnail image. Further, the controller 30 controls the display 20 to display a data item such as an image or a picture.

The controller 30 detects first and second touch inputs generated in the input 10 and detects a change in a distance between two input points, thereby performing a function related to an item list displayed in the display 20. A distance between the first and second touch input points can be increased or decreased.

When a data item is displayed in a list of an index form or a matrix form, if a distance between the first and second touch input points decreases, the controller 30 recognizes the decrease of a distance as a data deletion signal and deletes a data item. For example, when the user selects both sides of a predetermined data item and inputs a touch signal in a direction for decreasing a distance between both sides and thus a distance between the touch input points decreases, the controller 30 deletes the corresponding item. If a distance between the first and second touch input points increases, the controller 30 controls to display an input window for adding data. Accordingly, the user can input data to add to a displaying list, and the controller 30 adds the input data to the displaying list.

Further, when an image is being displayed, the controller 30 processes touch signals with an image data editing signal for editing color characteristics such as brightness, contrast, gamma, hue, saturation, and sharpness of an image. Accordingly, when touch signals are input in a direction for decreasing a distance between the first and second touch input points, the controller 30 controls to decrease color characteristics of a displaying image. When touch signals are input in a direction for increasing a distance between the first and second touch input points, the controller 30 controls to increase color characteristics of a displaying image.

In this way, the electronic device can use an editing function of adding data to, deleting data from, or correcting data of a list through an operation of increasing or decreasing a distance between touch input points that are input through a touch screen.

Figure 2:
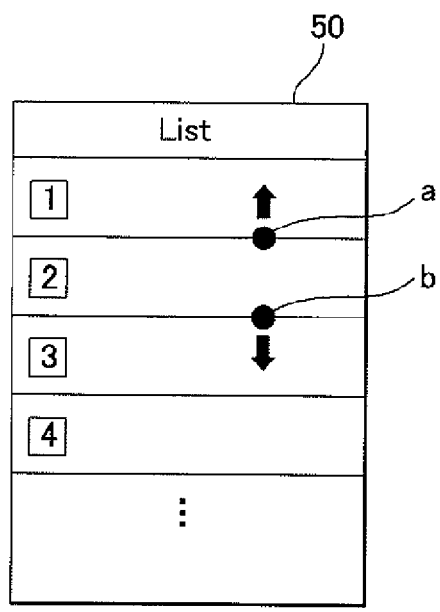
FIG. 2 is a diagram illustrating an input process in a method of editing data in an implementation.

FIG. 2 is a diagram illustrating an input process in a method of editing data of an electronic device in an implementation and illustrates a method of editing a data item provided in a list of an index form.

As shown in FIG. 2, a data item stored in the memory 40 or generated by a processing can be displayed on a list screen 50. For example, an item such as a phonebook, a memo, event setting, and a ringtone can be displayed on the list screen 50.

In order to add new data to a list, the user can select 'a' point and 'b' point on the list screen 50 and input a touch signal in a direction for separating two points from each other, i.e. in a direction for increasing a distance between touch input points.

Accordingly, the controller 30 processes the input touch signal as a list addition signal and controls to display a data addition window so that the user adds new data to a list. For example, when a phone book list is being displayed, the controller 30 controls to display a phone number input window, and when a memo list is being displayed, the controller 30 controls to display a memo input window.

Further, the controller 30 can control to display an input window in an area between 'a' point and 'b' point, which are a starting point of the first and second touch signals. In this case, the user can insert a desired data item at the middle of the list.

Figure 3:
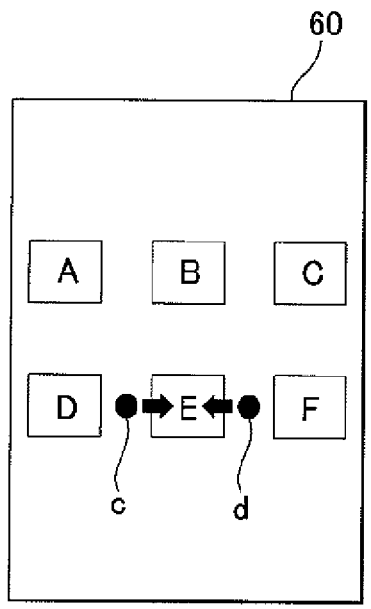
FIG. 3 is a diagram illustrating an input process in a method of editing data in another implementation.

FIG. 3 is a diagram illustrating an input process in a method of editing data of an electronic device in another implementation and illustrates a method of editing a data item provided in a matrix form.

As shown in FIG. 3, a data item stored in the memory 40 or generated by a processing can be displayed on a matrix screen 60. For example, a data item such as a picture photographed by the user, a received multimedia card, and a desktop screen image can be arranged in the display 20 in a matrix form using the corresponding thumbnail image.

In order to delete a predetermined data item, the user selects 'c' point and 'd' point, which are a surrounding area of an item to delete among data items arranged in a matrix form and inputs a touch signal in a direction for approaching two touch points, i.e. a direction for decreasing a distance between touch input points.

Accordingly, according to a touch signal for decreasing a distance between touch input points, the controller 30 deletes a data item interposed in the corresponding reference area, and deletes, when a plurality of data items is interposed in an area between touch points, all data items.

Figure 4:
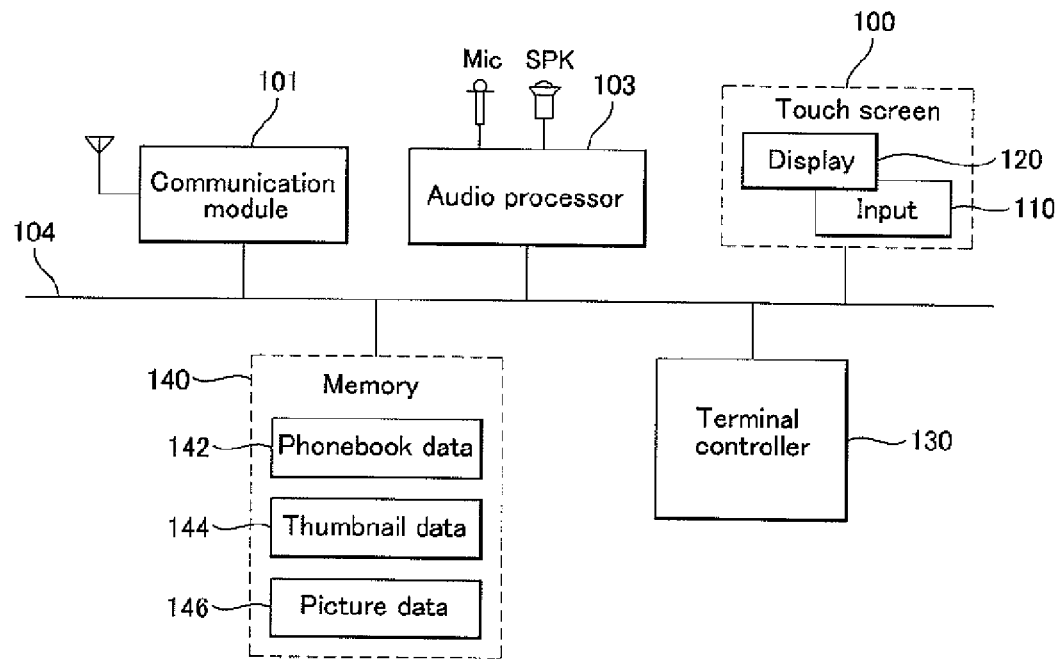
FIG. 4 is a block diagram illustrating a configuration of a mobile communication terminal in an implementation.

FIG. 4 is a block diagram illustrating a configuration of a mobile communication terminal in an implementation.

As shown in FIG. 4, the mobile communication terminal comprises a communication module 101 for wireless transmission and reception, an audio processor 103 for processing an audio signal input/output through a microphone MIC and a speaker SPK, a memory 140 for storing a data item, a touch screen 100 for displaying user input and a screen, and a terminal controller 130 for controlling units through a predetermined signal line 104 for transmitting a control signal and a data signal and executing general functions of a mobile communication terminal.

The touch screen 100 comprises a display 120 for displaying data and an input 110 that is a transparent panel having a touch response screen and that is mounted on a visible surface of the display 120.

The display 120 displays a processing screen according to user input, a state of a device, and function execution. The display 120 can use devices such as an LCD, a PDP, and an OLED.

The input 110 recognizes a selection position and a selection direction of a touch signal input by the user and provides a touch signal to the terminal controller 130. The input 110 can be embodied using various technologies such as a resistance method, a capacitance method, an infrared ray method, a SAW method, an electromagnetic method, and a NFI method.

The memory 140 stores data items that can be displayed in the display 120. The data item comprises data that can be edited, i.e. that can be stored, deleted, or corrected by the user, such as phonebook data 142, thumbnail data 144, and picture data 146.

The terminal controller 130 controls to display a data item stored in the memory 140 according to a touch signal input through the touch screen 100 or a data item generated by performing a predetermined function in a list of an index form or a matrix form. Accordingly, the terminal controller 130 controls the display 120 to display the phonebook data 142 in an index form or a picture data item in a matrix form using the thumbnail data 144 of the picture data 146. Further, the terminal controller 130 controls the display 120 to display the picture data 146.

The terminal controller 130 can detect the first and second touch signals input through the touch screen 100, detect a change in a distance between touch points, delete or correct data displayed in the touch screen 100 according to a detection result, and add new data. The first touch signal and the second touch signal can be input in a direction for increasing or decreasing a distance between both touch points.

When a data item is displayed in a list, the terminal controller 130 processes a touch signal of a direction for decreasing a distance between a first touch point and a second touch point as a data deletion signal. When a touch signal of a direction for increasing a distance between the first touch point and the second touch point is detected, the terminal controller 130 controls to display an input window for adding data. Accordingly, the user can input data to add to a displaying list, and the terminal controller 130 adds data input through the input window to the displaying list.

Further, when an image is being displayed, the terminal controller 130 processes touch signals with an image data editing signal for editing color characteristics such as brightness, contrast, gamma, hue, saturation, and sharpness of an image. Accordingly, when a touch signal of a direction for decreasing a distance between the first touch point and the second touch point is input, the terminal controller 130 controls to decrease color characteristics of a displaying image. When a touch signal of a direction for increasing a distance between the first touch point and the second touch point is input, the terminal controller 130 controls to increase color characteristics of a displaying image.

Figure 5:
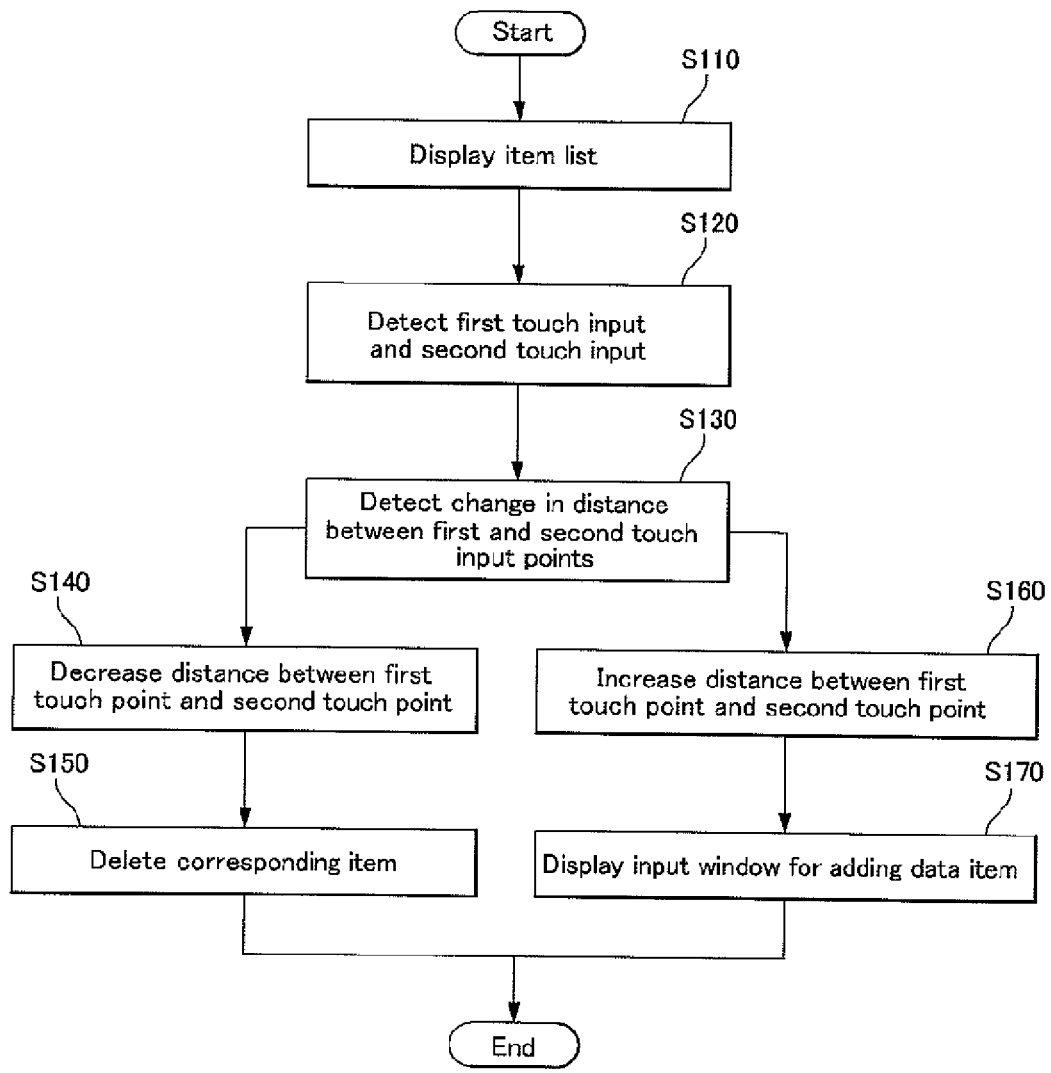
FIG. 5 is a flowchart illustrating a method of editing data of a mobile communication terminal in an implementation.
Figure 6:
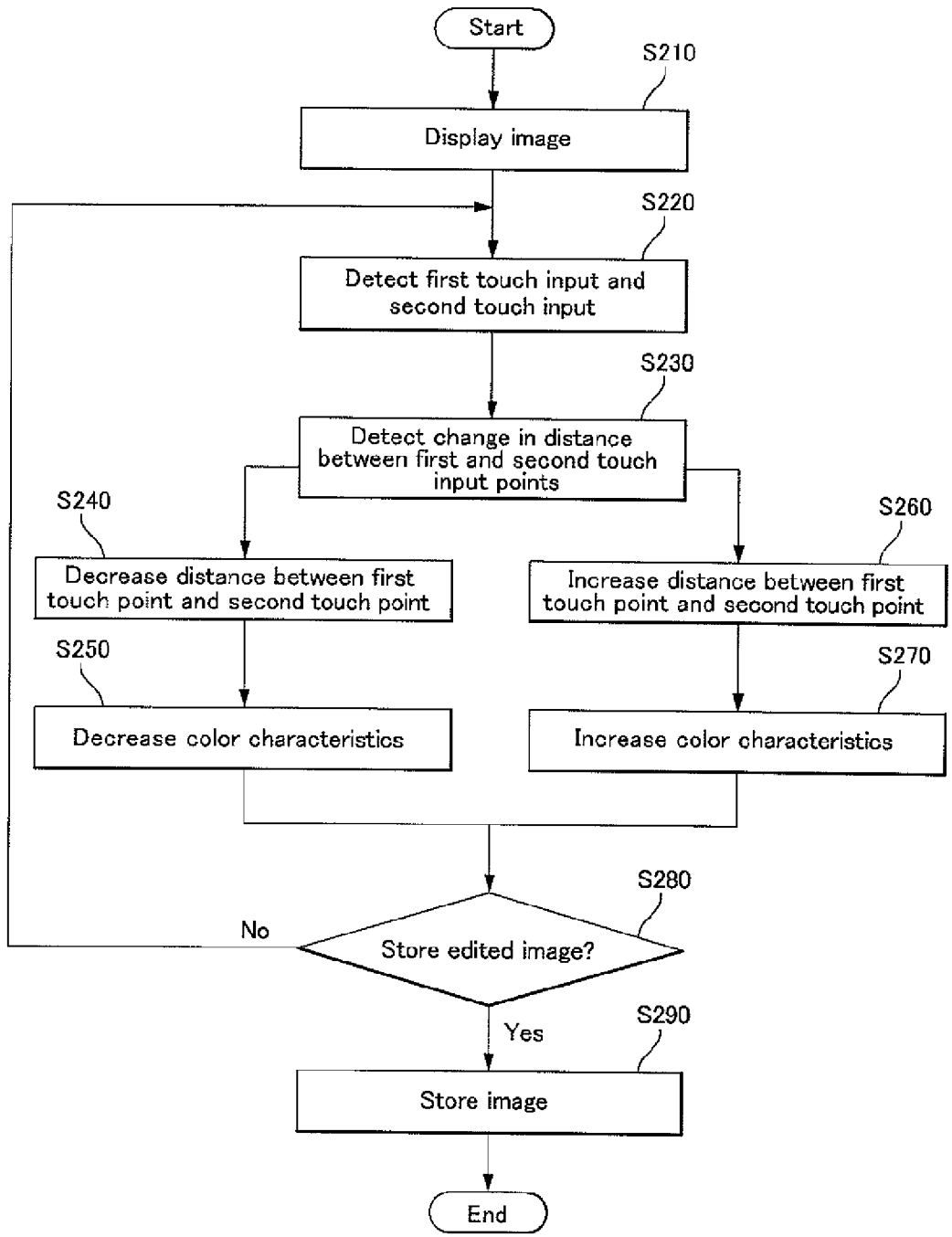
FIG. 6 is a flowchart illustrating a method of editing data of a mobile communication terminal in another implementation.

FIG. 5 is a flowchart illustrating a method of editing data of a mobile communication terminal in an implementation and illustrates a case of deleting or adding a data item.

The terminal controller 130 controls the display 120 of the touch screen 100 to display a predetermined item list by user selection (S110). The terminal controller 130 controls to display an item list such as the phonebook data 142 in a text index form, or the picture data 146 in a list of a matrix form using the corresponding thumbnail data 144.

The terminal controller 130 detects first touch input and second touch input that are input through the touch screen 100 (S120).

The terminal controller 130 detects a change in a distance between first and second touch input points (S130).

If touch signals are input in a direction for decreasing a distance between the first touch point and the second touch point (S140), the terminal controller 130 recognizes the input touch signals as a data deletion signal and deletes the corresponding item (S150). The touch signals of a distance decreasing direction indicate touch signals of a direction for approaching the touch points, i.e. a direction for decreasing a distance between the touch points after a surrounding area of an item to be deleted by the user is touched. Accordingly, the terminal controller 130 can delete a data item interposed in an area between the touch points and can delete, when a plurality of data items is interposed between touch points, all of the corresponding data items.

If touch signals are input in a direction for increasing a distance between the first touch point and the second touch point (S160), the terminal controller 130 recognizes the input touch signals as a data addition signal and controls to display an input window for adding a data item (S170). At various points of the process, a confirmation prompt may be displayed to request that the user confirm the change is desired. Also, a save and/or over-write prompt may be displayed to request that the user indicate if the change should be saved as a separate file or if the previous file should be over-written.

FIG. 5 is a flowchart illustrating a method of editing data of a mobile communication terminal in another implementation and illustrates a case of editing image data among data items.

The terminal controller 130 controls to display an image such as a user album picture in the display 120 of the touch screen 100 by user selection (S210).

The terminal controller 130 detects first touch input and second touch input that are input through the touch screen 100 (S220).

The terminal controller 130 detects a change in a distance between first and second touch input points (S230).

If touch signals are input in a direction for decreasing a distance between the first touch point and the second touch point (S240), the terminal controller 130 controls to decrease color characteristics of a displaying image (S250). For example, the terminal controller 130 controls to decrease color characteristics such as brightness, contrast, gamma, hue, saturation, and sharpness of a displaying image.

If touch signals are input in a direction for increasing a distance between the first touch point and the second touch point (S260), the terminal controller 130 controls to increase color characteristics of a displaying image (S270).

Thereafter, the terminal controller 130 determines whether an image edited by the user is stored (S280). If an image edited by the user is stored, the terminal controller 130 stores the edited image in the memory 140 (S290).

The mobile communication terminal in implementation controls to fluctuate color characteristics such as brightness, contrast, gamma, hue, saturation, and sharpness of an image in interlock with a fluctuation in a distance between the first touch point and the second touch point that are input through the touch screen 100. Accordingly, the user can edit color characteristics of an image with a simple touch operation without using a separate editing menu.

In the method of editing an image, a case of fluctuating color characteristics according to a change in a distance between touch points is described, however in the touch screen 100 in which an image is displayed, the method of editing an image may control, when touch signals are input in a direction for decreasing a distance between the first touch point and the second touch point, to delete the corresponding image, and when touch signals are input in a direction for increasing a distance between the first touch point and the second touch point, to store the corresponding image.

Figure 7:
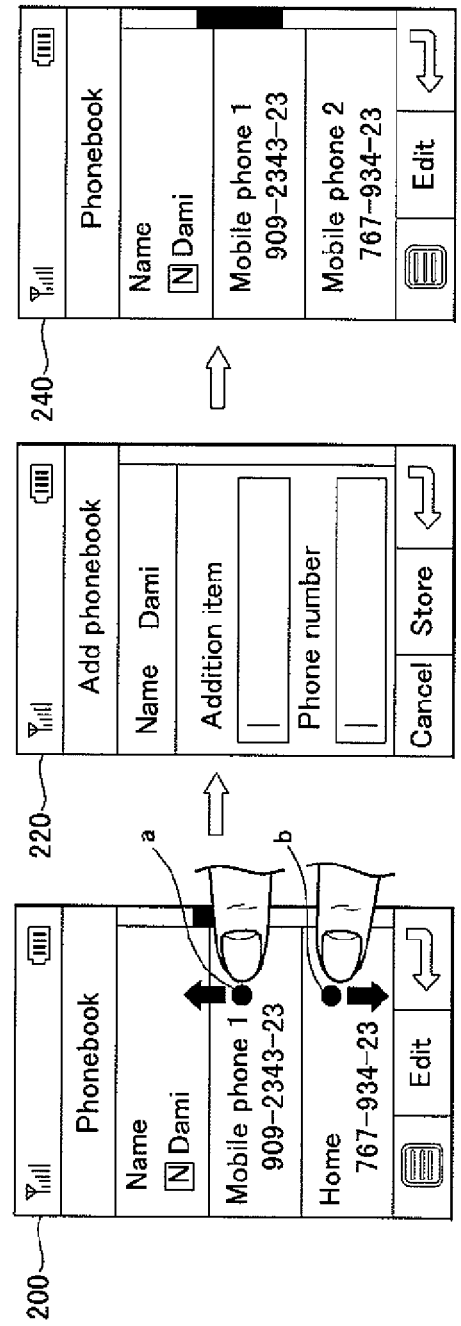
FIG. 7 is a diagram illustrating a process of editing data of a mobile communication terminal in an implementation.

FIG. 7 is a diagram illustrating a process of editing data of a mobile communication terminal in an implementation and illustrates a case of editing a phonebook list 200.

As shown in FIG. 7, in the phonebook list 200, a name, a mobile phone number, and a home phone number of a specific person input by the user can be displayed as a data item. Accordingly, when the user touches 'a' point and 'b' point, which are random points in the phonebook list and inputs a touch signal in a direction for increasing a distance between two touch points, the terminal controller 130 determines that a function of adding data to the phonebook list 200 is selected.

Accordingly, the terminal controller 130 provides an input interface 220 for inputting a new phonebook data item, and the user can input data to add to the input interface 220.

When the user inputs and stores "mobile phone 2" and the corresponding phone number, the terminal controller 130 controls to display a phonebook list 240 to which "mobile phone 2" and the corresponding phone number are added.

Figure 8:
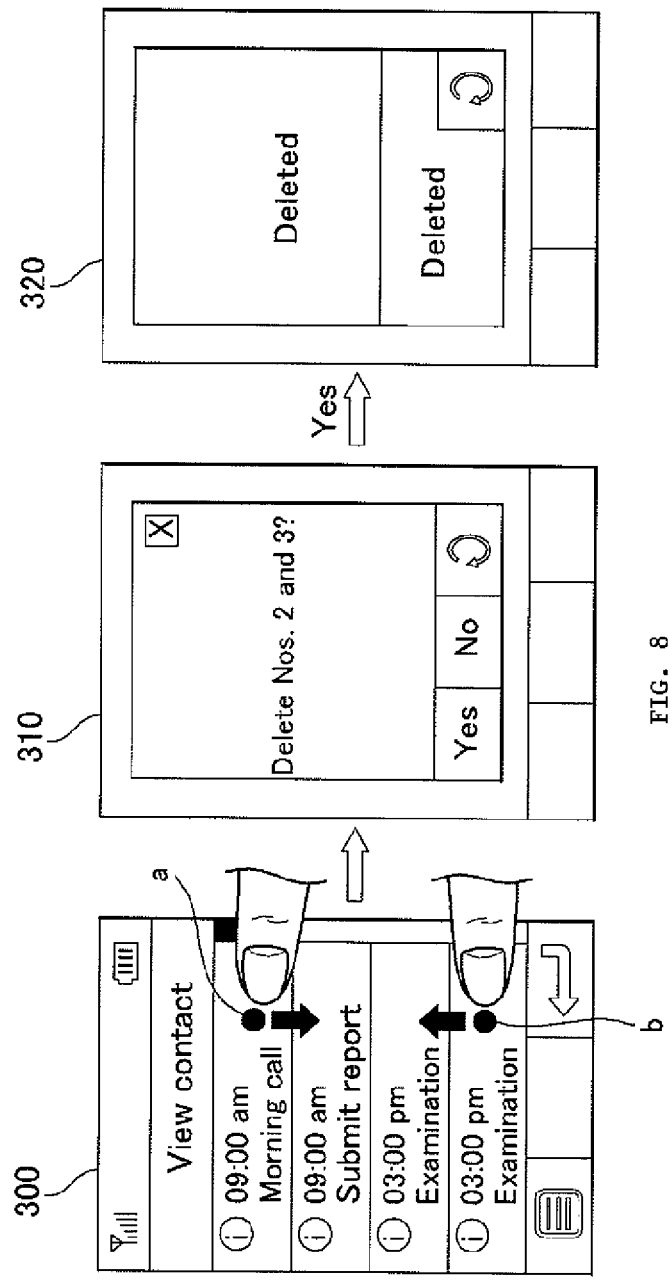
FIG. 8 is a diagram illustrating a process of editing data of a mobile communication terminal in another implementation.

FIG. 8 is a diagram illustrating a process of editing data of a mobile communication terminal in another implementation and illustrates a case of editing a communication list 300.

As shown in FIG. 8, in the communication list 300, a user's phone call records can be sequentially provided. When the user selects 'a' point and 'b' point in the communication list 300 and inputs a touch signal in a direction for decreasing a distance between two touch points, the terminal controller 130 determines that a function of deleting data of the communication list 300 is selected.

Accordingly, the terminal controller 130 controls to display a deletion selection window 310 for selecting whether to delete No. 2 item and No. 3 item interposed in an area between 'a' point and 'b' point.

The terminal controller 130 controls to delete the corresponding items (No. 2 item and No. 3 item) by user deletion selection and display an editing result through a processing result window 320.

Figure 9:
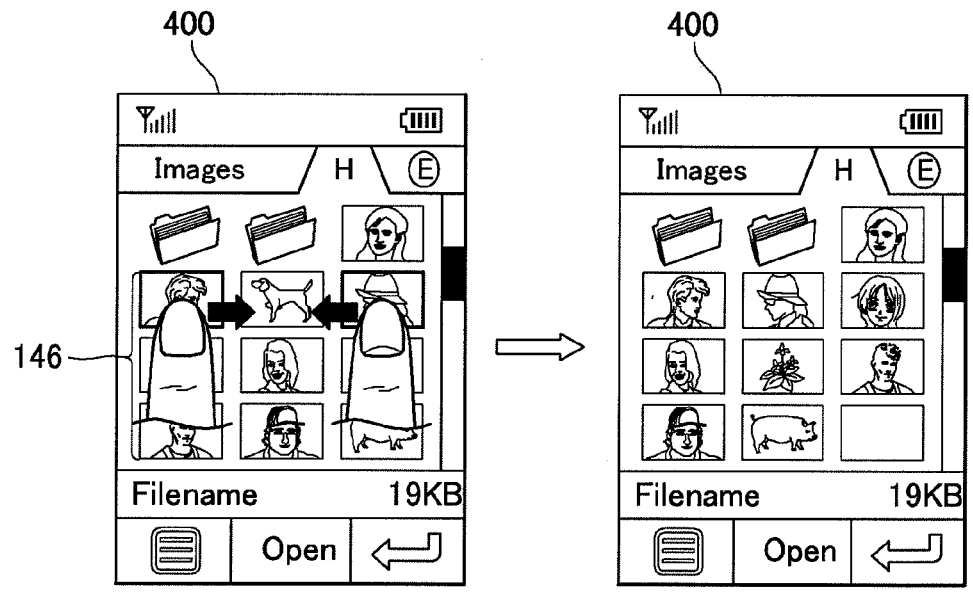
FIG. 9 is a diagram illustrating a process of editing data of a mobile communication terminal in another implementation.

FIG. 9 is a diagram illustrating a process of editing data of a mobile communication terminal in another implementation and illustrates a case of editing a picture list 400.

As shown in FIG. 9, in the picture list 400, a thumbnail data 144 corresponding to each picture data 146 are arranged in a matrix form. When the user selects 'a' point and 'b' point in the picture list 400 and inputs a touch signal in a direction for decreasing a distance between two touch points, the terminal controller 130 determines that a function of deleting data from the picture list 400 is selected.

Accordingly, the terminal controller 130 controls to delete an item interposed between 'a' point and 'b' point and display a picture list in which the corresponding item is edited.

Figure 10:
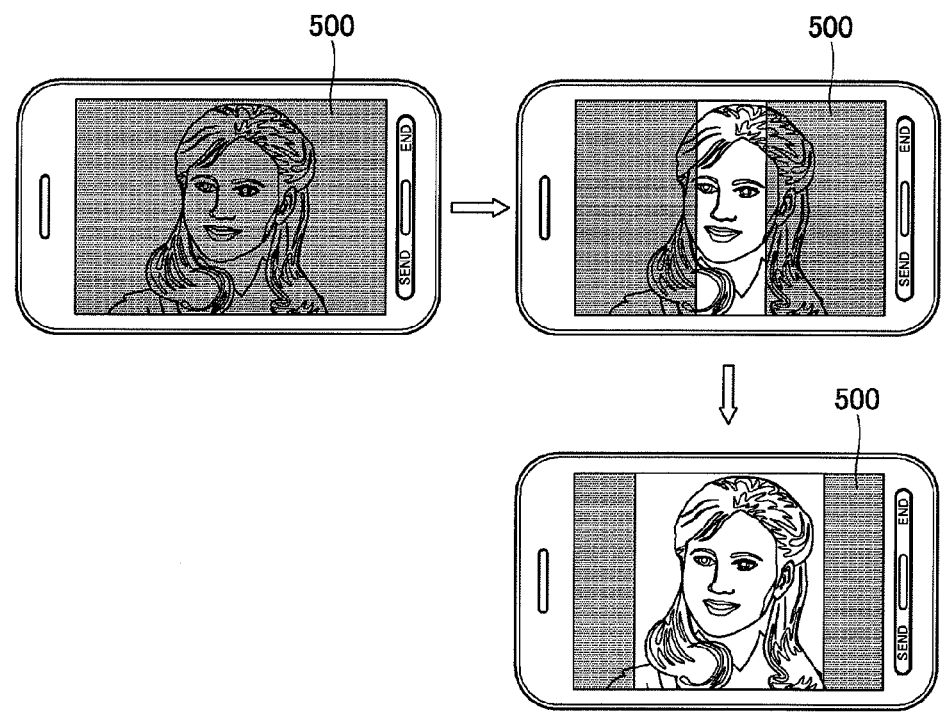
FIG. 10 is a diagram illustrating a process of editing data of a mobile communication terminal in another implementation.

FIG. 10 is a diagram illustrating a process of editing data of a mobile communication terminal in another implementation and illustrates a case of editing color characteristics of an image.

As shown in FIG. 10, the picture data 146 stored in an album menu or a picture menu can be displayed on a touch screen 500 by user selection. If the user selects two points on the touch screen 500 and inputs a touch signal in a direction for increasing a distance between two touch points, the terminal controller 130 controls to increase color characteristics, for example, brightness of an image displayed on the touch screen 500. The terminal controller 130 controls a process of changing brightness in interlock with an input operation of a touch signal, thereby increasing only brightness of a reference area opened by a touch signal. Accordingly, the user can easily compare original screen brightness and adjusted screen brightness and be interested in the process of changing brightness.

Thereafter, when editing of brightness characteristics is complete and an editing content is stored, the terminal controller 130 stores image data in which brightness characteristic is edited in the memory 140. Color characteristics such as temperature, contrast, gamma, hue, saturation, exposure and sharpness as well as brightness can be edited with the same method When the terminal controller 130 determines that a distance between two touch points selected on the touch screen 500 decreases, the terminal controller 130 controls to decrease color characteristics of an image displayed on the touch screen 500. Changes to the image may be saved as a replacement image, as a supplementary image data file, or as a supplementary image. Changed and original images may be displayed next to one another for comparison and further editing.

Other image characteristics such as focus, matte, edge blur, sepia, straightness, etc. may be added or deleted with the same method. Zooming and/or cropping of images may also be achieved with the same method (e.g., by touching and separating two touch points, an image may be zoomed and/or cropped so that the portions outside of the touch points are deleted, and the portions inside the touch points are retained.) Also, images may be cut by touching and bringing together two touch points.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

As described above, in an implementation, an electronic device, a method of editing data, and a mobile communication terminal can easily edit data using a touch screen.

Other features will be apparent from the description and drawings, and from the claims.

What is claimed is:

1. A method of editing data of an electronic device having a memory, the method comprising:

retrieving, by the electronic device, an item list from the memory, the item list comprising a plurality of items;

displaying, by the electronic device, the item list on a touch screen of the electronic device;

detecting, by the electronic device, two touch inputs at two touch input points, respectively, wherein at least one of the plurality of items is interposed in an area between the two touch input points;

detecting, by the electronic device, a difference between a first distance separating the two touch input points at a first time and a second distance separating the two touch input points at a second time; and as a result of the detected difference between the first and second distances separating the two touch input points at the first and second times, respectively:

storing in the memory at least one new item to the item list in the area between the first and second touch input points, or deleting from the memory at least one of the plurality of items that is interposed in the area between the first and second touch input points, wherein the at least one new item is stored in the memory only as a result of the detected difference between the first and second distances corresponding to the first distance being smaller than the second distance, and wherein the at least one item is deleted from the memory only as a result of the detected difference between the first and second distances corresponding to the first distance being greater than the second distance.

2. The method of claim 1, wherein the item list comprises a phonebook list containing a name and at least one contact information as one of items therein.

3. The method of claim 1, wherein the displaying of an item list comprises arranging and displaying the plurality of items in a matrix form or a sequential index form on the touch screen.

4. The method of claim 1, further comprising:
displaying one of a save and an over-write prompt.

5. An electronic device, comprising:
a memory;
a touch screen; and
a controller configured to:
  retrieve an item list from the memory, the item list comprising a plurality of items,
  display the item list on the touch screen,
  detect two touch inputs at two touch input points, respectively,
  detect a difference between a first distance separating the two touch input points at a first time and a second distance separating the two touch input points at a second time,
  wherein at least one of the plurality of items is interposed in an area between the two touch input points, and
  as a result of the detected difference between the first and second distances separating the two touch input points at the first and second times, respectively:
    store in the memory at least one new item to the item list in the area between the first and second touch input points, or
    delete from the memory at least one of the plurality of items that is interposed in the area between the first and second touch input points,
  wherein the at least one new item is stored in the memory only as a result of the detected difference between the first and second distances corresponding to the first distance being smaller than the second distance, and
  wherein the at least one item is deleted from the memory only as a result of the detected difference between the first and second distances corresponding to the first distance being greater than the second distance.

6. The device of claim 5, wherein the item list comprises a phonebook information list and the predetermined function relates to editing of the phonebook information list.

7. The device of claim 5, wherein said controller is configured to cause the display to display one of a save and an over-write prompt.

* * * * *